Figure 1:
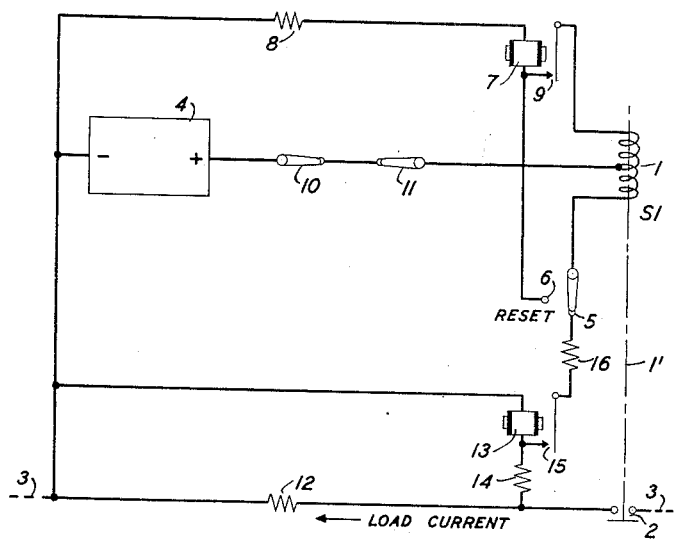

Sept. 18, 1956  R. R. BLAIR  2,763,817
PROTECTION CIRCUIT
Filed Sept. 30, 1952  5 Sheets-Sheet 1

INVENTOR
R. R. BLAIR
BY
Walter M. Hill
ATTORNEY

Sept. 18, 1956  R. R. BLAIR  2,763,817
PROTECTION CIRCUIT
Filed Sept. 30, 1952  5 Sheets-Sheet 2

INVENTOR
R. R. BLAIR
BY
Walter M. Hill
ATTORNEY

INVENTOR
R. R. BLAIR
BY Walter M. Hill
ATTORNEY

Sept. 18, 1956

R. R. BLAIR 2,763,817

PROTECTION CIRCUIT

Filed Sept. 30, 1952

5 Sheets-Sheet 5

| FIG.6 | FIG.5 | FIG.7 |

INVENTOR
*R. R. BLAIR*
BY
*Walter M. Hill*
ATTORNEY

2,763,817
PROTECTION CIRCUIT

Royer R. Blair, Berkeley Heights, N. J., assignor to Bell Telephone Laboratories, Incorporated, New York, N. Y., a corporation of New York Application September 30, 1952, Serial No. 312,350

3 Claims. (Cl. 317—51)

This invention relates to the art of protection circuits and more particularly to circuits adapted to the protection of sensitive electrical measuring instruments and other apparatus from damage due to sudden overloads.

It is an object of this invention to provide an improved means for protecting electrical apparatus from damage caused by destructive overload currents.

The foregoing object is achieved by this invention which comprises an overload relay protection circuit wherein a differential relay is operated by current flowing through one winding thereof to supply power to the protected apparatus. Means is provided to pass current through the differential winding to quickly release the differential relay when an excessive current flows. The invention also includes means to prevent the application of current to a load until the power source voltage has been reduced to a predetermined level, for example to zero.

Figure 2:
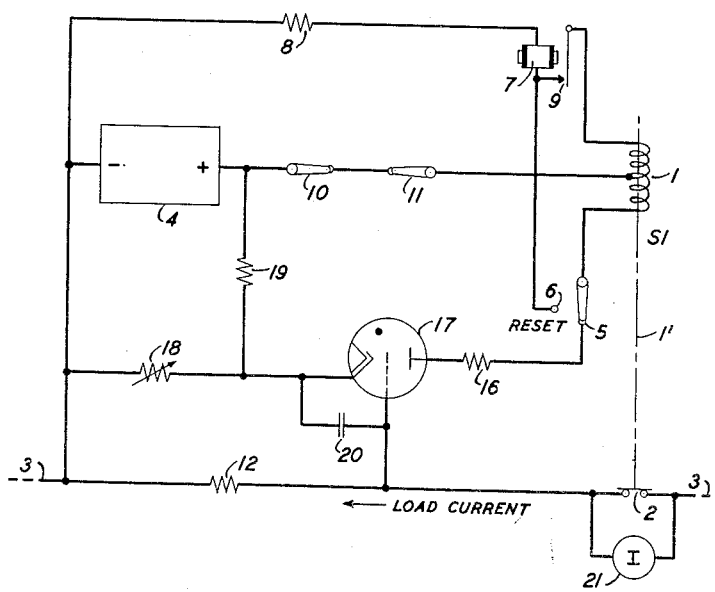
Figure 3:
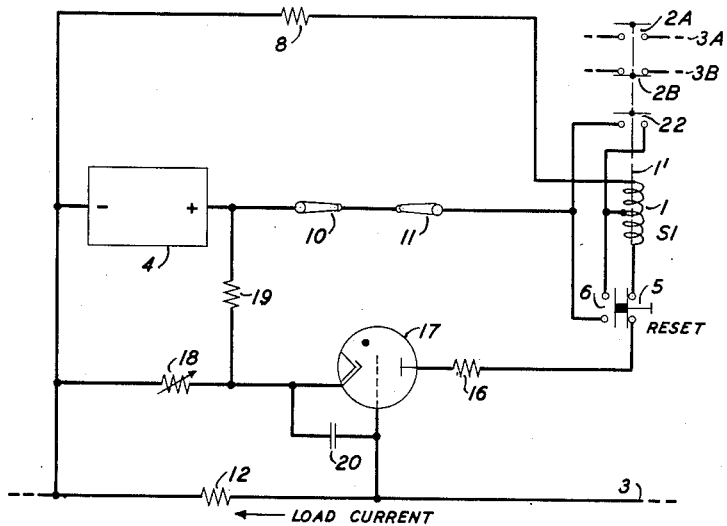
Figure 4:
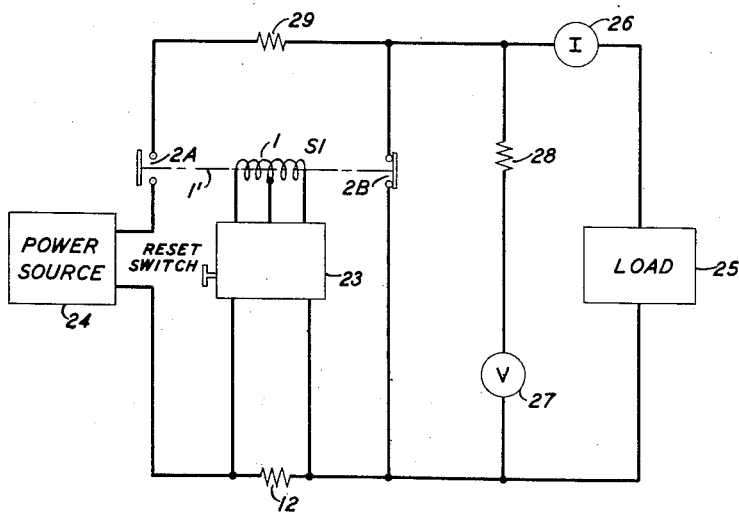
Figure 5:
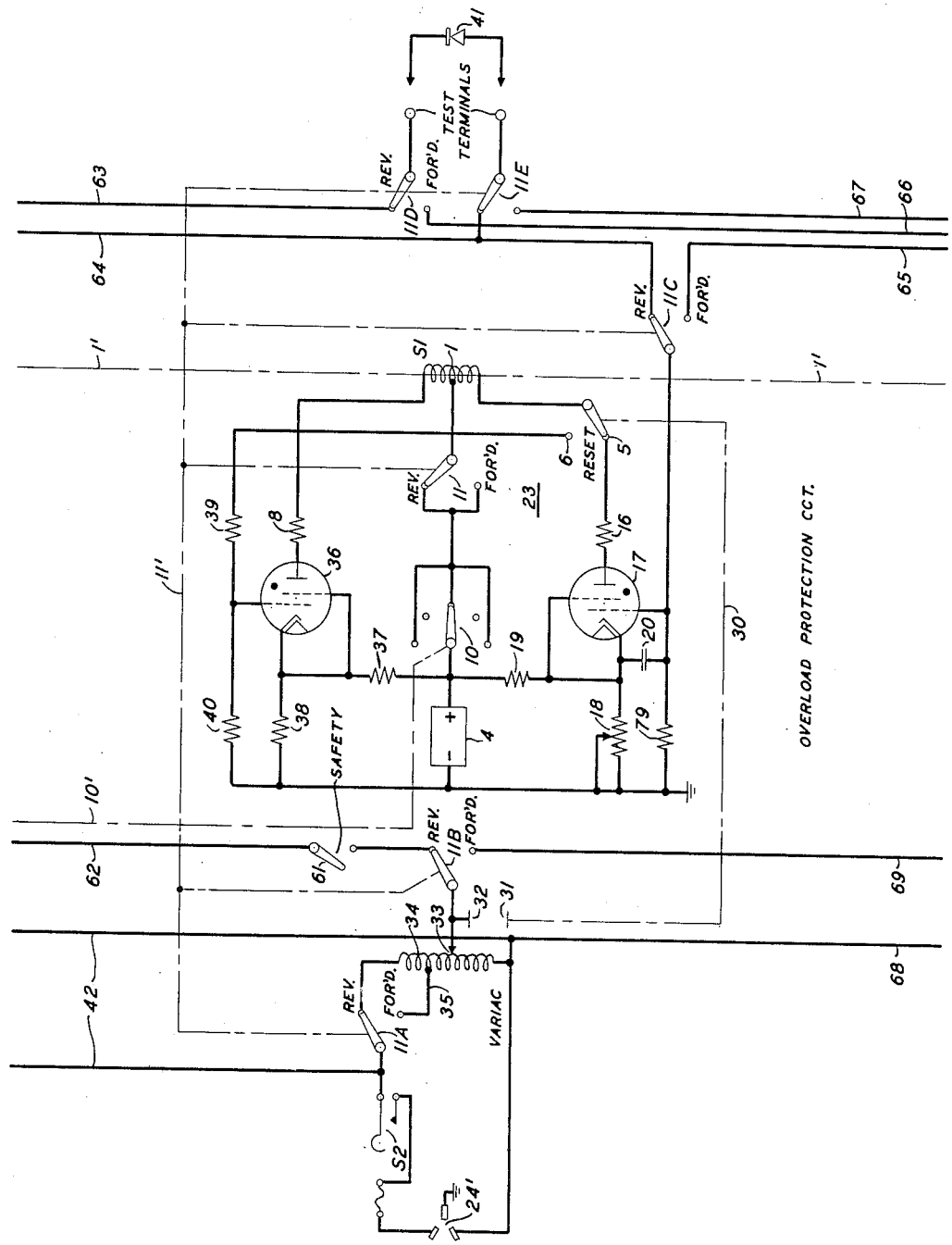
Figure 6:
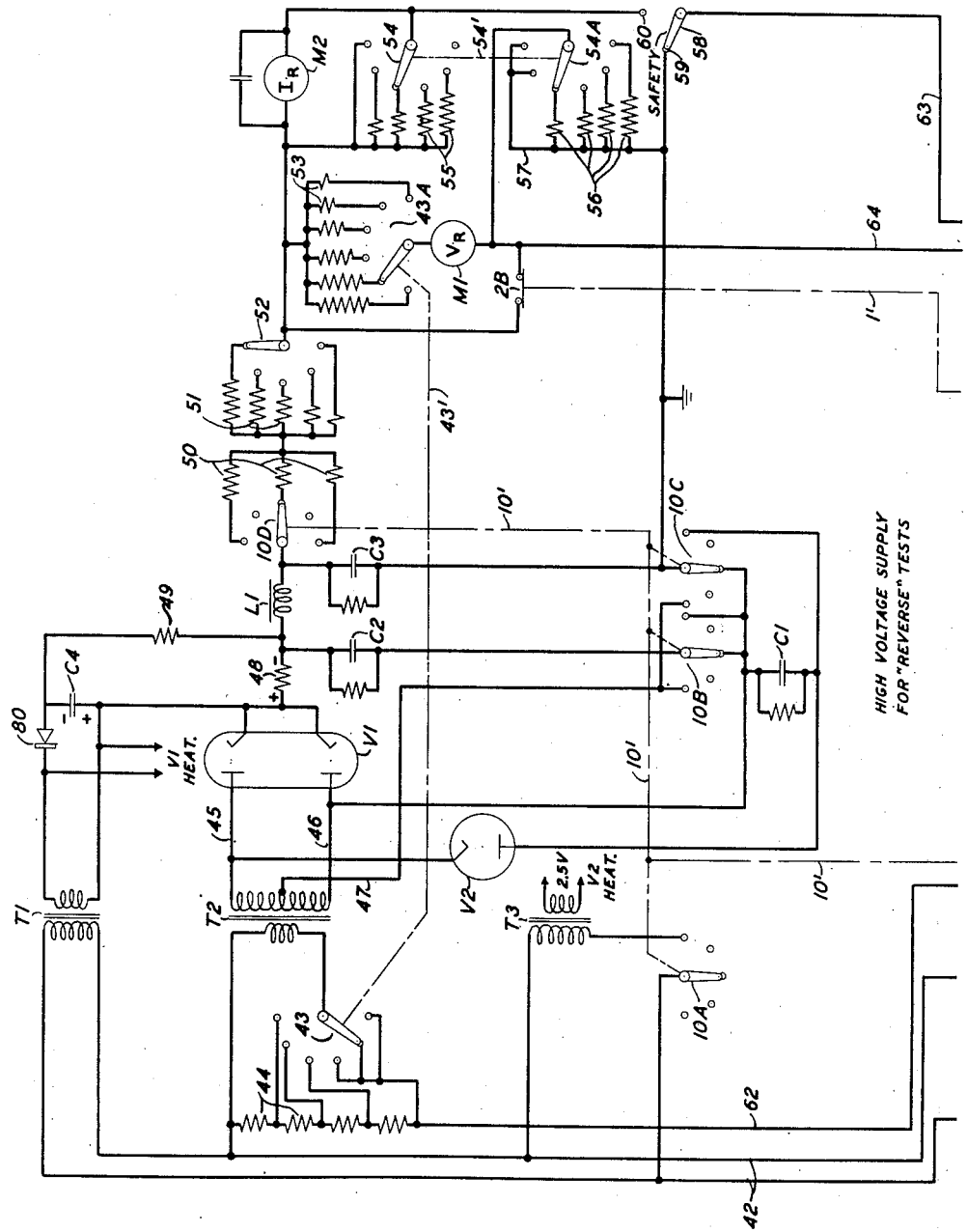
Figures 7, 8:
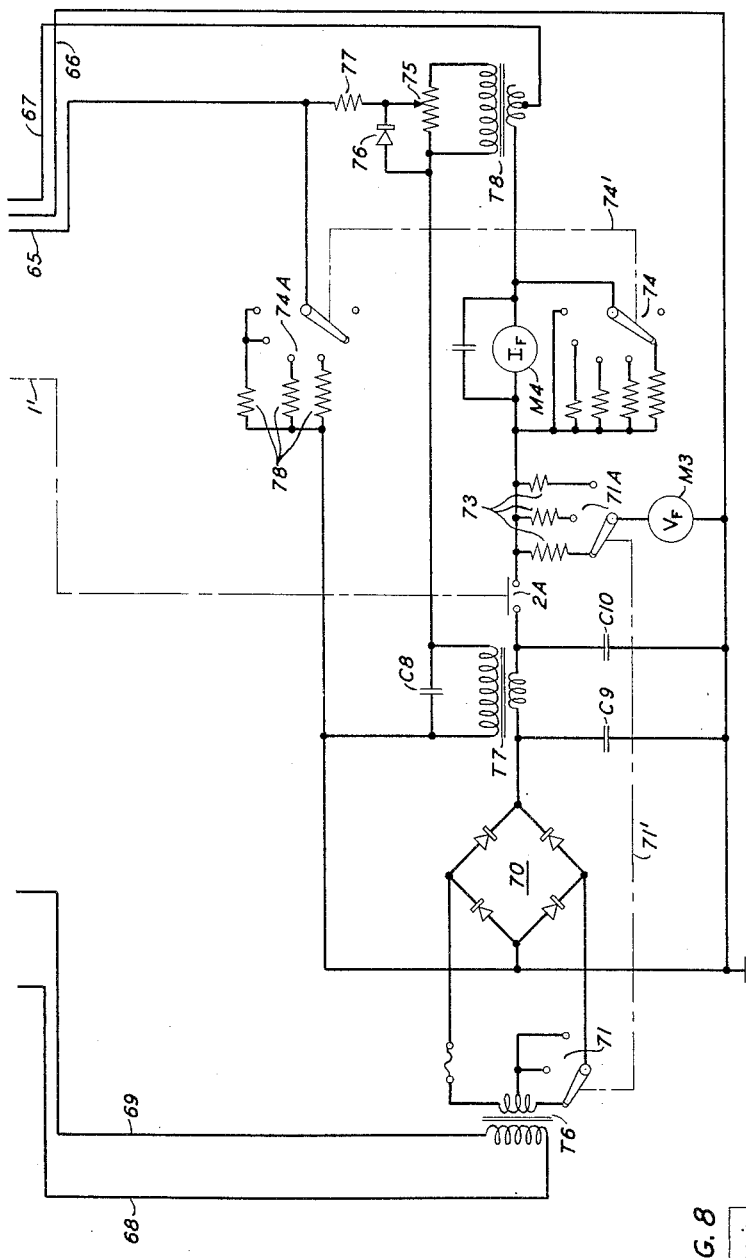

The invention may be better understood by referring to the drawings in which:

Fig. 1 discloses an embodiment of the invention employing an electromagnetic relay means;

Fig. 2 discloses a different embodiment of the invention including a gaseous discharge tube for detecting overload currents;

Fig. 3 discloses a still further modification of the invention wherein the differential relay includes means for maintaining itself in its operated position;

Fig. 4 discloses a practical application of the invention disclosed in each of Figs. 1 to 3 as applied to a measuring circuit;

Figs. 5, 6 and 7 disclose more complete circuits of a practical embodiment of the invention applied to a testing circuit for testing asymmetric conductors; and Fig. 8 discloses the relative arrangement of Figs. 5, 6 and 7.

Referring now to Fig. 1, it will be noted that a differential relay S1 comprises a winding 1 and a pair of normally open contacts 2. Contacts 2 are adapted to close a circuit 3 to control the current to a load, not shown in this figure. Relay S1 is energized from a source 4 through one of its windings upon the operation of the reset switch labeled "Reset" from its contact 5 to its contact 6, thereby momentarily completing a circuit path from source 4 through switches 10 and 11, the lower half of coil 1, the reset switch contact 6, relay coil 7 and resistor 8. This results in the energization of relay 7 to close its contacts 9. Contacts 9 serve to lock relay 7 through the upper winding of coil 1 so that, upon the release of the reset switch to its contact 5, differential relay S1 remains energized through its upper winding, thereby holding contacts 2 closed. It will now be evident that contacts 2 of switch S1 may be opened by either momentarily opening switch 10 or switch 11, thereby removing the power source from the relay, or by energizing the lower half of differential winding 1 which thereby releases the relay in a conventional manner well understood in the art.

Switches 10 and 11 are associated with other switches not shown in this figure but which will be described in further detail later. Those associated with switch 10 are adapted to change the voltage range of the source while those with switch 11 change the direction of current through the load. In either case, it is desired that the power source be immediately disconnected from the load to avoid accidental injury to either the load or to measuring instruments which may be connected in circuit with the load.

Contacts 2 are automatically opened by reason of an overload current flowing through circuit 3 which includes resistor 12 in series therewith. When the voltage across resistor 12 reaches a predetermined critical limit, sufficient current flows through resistor 14 and relay coil 13 to cause this relay to close its contacts 15. It will be noted that a circuit is thus completed from source 4 through resistor 16 and the lower half of the differential coil 1. Resistor 16 is selected of such size as to cause the current flow through the lower half of coil 1 to just balance the flux created by the current flow in the upper half of the coil. The differential relay is thereby deenergized to immediately open its contacts 2 which will remain open until the reset switch is again operated.

The circuit of Fig. 2 operates in substantially the same manner as already described for Fig. 1. In this figure, a tube 17 is substituted for relay 13 and an ammeter 21 is connected across normally closed contacts 2 for protection. The meter is thus short-circuited by these contacts and can only be brought into the circuit by the energization of differential relay S1 upon the operation of the reset switch to its contact 6. Relay S1 is held energized by current flowing through its upper winding in the same manner described for Fig. 1 whereupon meter 21 is connected in series with the load circuit 3. Should an excessive current flow, the voltage drop across resistor 12 will cause gaseous discharge tube 17 to begin conducting so that current will flow from source 4 through the lower half of coil 1, through resistor 16, through tube 17 and resistor 18. The current flowing through resistor 12 at which tube 17 begins conducting depends upon the critical discharge voltage required between the cathode of tube 17 and its grid. The voltage between these electrodes is adjusted by variable resistor 18 which is connected in series with source 4 and a resistor 19. It will be understood that by the adjustment of this resistor, tube 17 may be caused to discharge at any predetermined current through resistor 12. Capacitor 20 prevents undesired conduction of tube 17 mainly due to spurious switching transients. As in the case of Fig. 1, this circuit is reset by momentarily moving the reset switch to contact 6.

Fig. 3 differs slightly from Figs. 1 and 2. It will be noted that relay 7 has been eliminated and its function is taken over by an extra pair of contacts 22 on relay S1. It will also be noted that the differential relay S1 is equipped for providing protection to two circuits 3A and 3B which correspond to circuits 3 of Figs. 1 and 2, respectively.

Upon the operation of the reset switch, contacts 6 are momentarily closed to cause current to flow through the upper half of coil 1. Relay S1 is thereby energized to close contacts 22 and 2A and to open contacts 2B. It will be noted that contacts 22 bridge reset contacts 6 so that, upon the release of the reset switch, differential relay S1 remains operated through a circuit path including contacts 22. Should the load current exceed a predetermined critical limit, tube 17 is caused to discharge in the same manner as was previously described for Fig. 2, whereupon current flows through tube 17, through resistor 16, through normally closed contacts 5 and through the lower half of coil 1 thereby deenergizing differential relay S1. Contacts are thus opened so that the power source 4 is disconnected from both windings of the differential relay, thereby stopping the flow of current through these windings and through discharge tube 17.

The protection circuit 23 of either Fig. 1, Fig. 2 or Fig. 3 is shown connected into a test circuit in Fig. 4. Here relay S1 is shown with a pair of normally open contacts 2A and a pair of normally closed contacts 2B. Upon the energization of relay S1 current is passed through contacts 2A from power source 24 to a load 25 by way of an ammeter 26. The short circuit provided by contacts 2B is also removed so as to connect voltmeter 27 across the load through a multiplier resistor 28. Resistor 29 may be provided to prevent excessive flow of current in the event contacts 2B close an instant before contacts 2A open. If the source has a high voltage, this resistor also serves to limit the current to a value which is safe to the operator. The short-circuit connection provided by contacts 2B effectively prevents the application of any voltage to the load. The operation of the protection circuit of Fig. 4 is otherwise identical to that described for the previous figures.

Figs. 5, 6 and 7 should be arranged as shown in Fig. 8. The overload protection circuit of this invention is shown in Fig. 5. Switches are provided whereby the circuit may be associated with either a power supply as shown in Fig. 6 or with a power supply as shown in Fig. 7. This particular embodiment of the invention will serve to illustrate a practical use of the invention as applied to the testing of asymmetric conductors, as for example, rectifiers of the semi-conductor type. These tests usually consist of determining the voltage-current characteristic in both the "forward" and "reverse" directions. Such a rectifier 41 may be connected to the two test terminals shown in Fig. 5. In order to test the "reverse" characteristic of such a conductor, a high voltage supply is required since these conductors have relatively high reverse current resistances. For this purpose, the power supply shown in Fig. 6 is provided and is adapted to provide a wide range of relatively high voltages. For testing the device in the "forward" direction where its resistance is relatively small, a low voltage, high current source is required such as is shown in Fig. 7. The switches connect the test terminals to only one of these power sources at a time.

Referring again to Fig. 5, it will be noted that the overload protection circuit differs slightly from the circuits shown in Figs. 1 to 3 inclusive. In Fig. 5, differential relay S1 is controlled by two gaseous discharge tubes 17 and 36, respectively. Tube 17 provides the same function as relay 13 of Fig. 1 and tubes 17 of Figs. 2 and 3. Tube 36 provides the same function as relay 7 of Figs. 1 and 2. The circuit, otherwise, is essentially identical to the previous figures and it operates in essentially the same way.

Briefly, with respect to Fig. 5, the protection circuit is reset by operating the reset switch from contact 5 to contact 6, thereby momentarily applying a potential to the control grid of tube 36. Tube 36 will then begin conducting to cause current to flow through the upper half of coil 1, thereby energizing relay S1 to open contacts 2B of Fig. 6 and close contacts 2A of Fig. 7 by way of mechanical linkage 1'. The reset button is then returned to contact 5 so that, should tube 17 begin conducting because of an overload, current will flow through the lower half of coil 1 in the manner previously described for the other figures. When tube 17 conducts, differential relay S1 will immediately release to close protection contacts 2B of Fig. 6 and open protection contacts 2A of Fig. 7. It is obvious that the opening of contacts 2A will disconnect the low voltage power source from its load and the closure of contacts 2B will short-circuit the high voltage power supply, thereby effectively removing either source from its load. Tube 36 is provided with a pair of resistors 37 and 38 connected in its cathode circuit corresponding with resistors 19 and 18, respectively, of tube 17. As the grid of tube 17 must be switched from one power supply to the other, depending upon which one is to be used, a separate grid resistor 79 is provided for this tube. The operation of the other switches shown in Fig. 5 will be described later in connection with the description of the circuit operation.

To supply power to the set, plug 24' is connected to a power source, not shown. It is obvious that power supply 4 may also derive its energy through plug 24'. Switch S2 is then closed to supply power to a variable autotransformer known as a Variac which comprises a winding 34 and adjustable contact 33. It will be understood that as contact 33 is moved to its lowermost position, the output voltage from the transformer is reduced to zero. When contact 33 is at its lowermost position a projection 32 engages a similar projection 31 on mechanical linkage 30 to operate the reset switch. It is preferable that the reset switch be incapable of operation in any other way so that it is impossible to supply power to the load without first having the output voltage from the Variac reduced to zero. This provides additional protection. Upon the closure of main switch S2, power is also immediately supplied to the primary of transformer T1, thereby heating the cathodes of tube V1.

It will be remembered that switch 11 in Fig. 5 is connected in series with power source 4 and the coil 1 of relay S1. This switch is mechanically linked with several other switch sections 11A, 11B, 11C, 11D and 11E, respectively, through a mechanical linkage 11'. These switch sections operate to transfer the load and protection circuit from one power supply to the other. It will thus be apparent that should there be any attempt to switch the load from the "reverse" power supply of Fig. 6 to the "forward" power supply of Fig. 7 or vice versa, the circuit path through switch 11 will be momentarily opened, resulting in the instantaneous operation of the protection circuit to disconnect the power supply from the load.

If switch 11 is in the position shown in Fig. 5, the high voltage power supply of Fig. 6 is connected to the test terminals for "reverse" current tests. This power supply circuit includes two rectifier tubes V1 and V2. Tube V1 is of the twin diode type and tube V2 is a single diode. By means of switches 10A, 10B, etc., three different rectifier circuits may be set up to provide three maximum voltage ranges of, for example, 600 volts, 1,200 volts and 2,400 volts, respectively. The lowest range is developed by connecting tube V1 to transformer T2 as a full wave rectifier. The next range employs one section of V1 as a half wave rectifier. The highest range is obtained by adding tube V2 to act as a voltage doubler in cooperation with one section of tube V1. Each of these three circuits are of a conventional type. It will be noted that upon the operation of switch 10 of Fig. 5 switch sections 10A, 10B, 10C and 10D of Fig. 6 are also caused to operate through a mechanical linkage 10'. In the first two positions of this switch tube V2 is not energized but in the third switch position where the doubler circuit is used, transformer T3 is connected to the power source through conductors 42 to heat the cathode of this tube.

In the first of the switch positions with switch sections 10A, 10B, and 10C to the extreme left, the full wave rectifier circuit is set up. This rectifier circuit includes both diode sections of tube V1 which are connected to the secondary of transformer T2 through conductors 45 and 46. The center-tap 47 of this transformer is connected through switch section 10C to ground. By tracing out the circuits thus formed, it will be evident that they constitute a conventional type of full wave rectifier having a filter comprising two condensers C2 and C3 and an inductor choke L1. This switch position thus provides the lowest voltage range of the high voltage power supply. A variable voltage is supplied to the primary of transformer T2 from the output circuit of the Variac of Fig. 5 through switch section 11B, safety switch 61, conductor 62 and one of the conductors 42. A potential divider comprising a plurality of resistors 44 and a switch 43 provides a further adjustment of the voltage range for the rectifier. The output from the rectifier is taken from between ground and a circuit path through switch section 10D, any one of a plurality of resistors 50 and 51, switch 52, a current meter M2, a safety switch 58 and conductor 63 to the upper test terminal through switch 11D. The other test terminal is returned to ground through switch 11E, conductor 64, switch section 54A and resistor 56.

Resistors 50 provide a current limiting function so that the output current cannot exceed, for example, five milliamperes as a safety precaution. Resistors 51 are selected to provide a more nearly constant current to meet certain test requirements. Resistors 56 perform the same function in this circuit as does resistor 12 of Fig. 1. It will be noted that the entire load current flows through one of these resistors from conductor 64 to ground.

A current meter M2 is provided with a plurality of shunts 55 which may be selected by a switch 54. As switch 54 is adjusted to different current ranges, switch section 54A is simultaneously adjusted through linkage 54′.

A voltmeter M1 is connected substantially across the load circuit through a plurality of multiplier resistors 53 which may be selected by a switch section 43A. The voltage across resistor 55 and the meter M2 is small compared with the total voltage and may be neglected. It will be noted that switch section 43A is mechanically linked with switch 43 through linkage 43′ so as to change the voltmeter range when switch 43 selects a different voltage input range to transformer T2.

To avoid contact potential difficulties in the rectifier when the Variac is adjusted to zero volts, the contact potential is balanced by means of a rectifier 80 connected to the secondary of transformer T1. The rectifier component from this rectifier appears across capacitor C4. A potential divider comprising resistors 48 and 49 is connected across capacitor C4 and the resistors thereof are so proportioned as to provide the necessary balancing potential across resistor 48. It will thus be apparent that as the Variac is adjusted to zero volts the contact potential of the rectifier is just balanced by the potential across resistor 48.

Before proceeding with the description of Fig. 7, the operation of the protection circuit of Fig. 5 together with the power supply circuit of Fig. 6 will be described.

With power supply plug 24′ connected to a suitable source of alternating current and main switch S2 closed, time is allowed for the cathodes of tube V1 to heat up from power supplied from transformer T1. Switch mechanism 11′ is operated to the "REV" position as shown in Fig. 5. This will connect the test terminals to the output circuit 63—64 of the high voltage supply shown in Fig. 6. Assuming that the maximum voltage requirement for the particular apparatus to be tested will not exceed 600 volts, switch mechanism 10′ is operated to move switch sections 10A, 10B and 10C to their extreme left positions, thereby connecting rectifier V1 as a full wave rectifier in the manner already described. Switch mechanism 43′ is also operated to further limit the maximum voltage to the required value. Switch mechanism 54′ is adjusted to the proper current range.

With a test specimen 41 connected to the test terminals the Variac slider 33 is moved to its zero position so as to operate switch mechanism 30 and cause the overload protection circuit to reset by reason of the movement of its reset switch from contact 5 to contact 6. This results in tube 36 discharging to energize the upper half of winding 1 of relay S1. Upon the energization of this relay, protection contacts 2B in Fig. 6 are opened so as to remove the short circuit from across the output circuit of the rectifier. The Variac slider 33 is then moved up to a suitable voltage setting and power is applied to the test specimen by simultaneously operating safety switches 61 and 58. These two safety switches are located at well separated points on the test set so as to require the operator to use both hands, thereby increasing the safety to the operator. As safety switch 61 is closed, output voltage from the Variac is applied to the input winding of transformer T2 and as safety switch 58 is operated the short circuit provided by contact 59 is removed from the test terminals and the test terminals are connected to switch contact 60 and from thence to the high voltage side of the power supply through meter M2. The voltage across the specimen is read on meter M1 and the current is read on meter M2. These tests may be repeated as frequently as necessary with different voltage settings of the Variac until all of the data pertaining to the voltage-current characteristic of the specimens are obtained.

If the test conditions require a voltage higher than 600 volts, the 1200-volt range may be obtained by operating tube V1 as a half-wave rectifier as previously described. This is accomplished by merely operating switch mechanism 10′ so that these switch sections are in the positions shown in Fig. 6. It will be remembered that when this operation is performed, switch 10 of Fig. 5 is also moved so as to momentarily interrupt the current flow through tube 36 thereby immediately releasing protection relay S1 to close protection contacts 2B of Fig. 6. This prevents the application of the high voltage to the meters and to the test specimen without first returning the Variac slider 33 to its zero voltage position. This serves to effectively protect both the test instruments and the test specimen against the inadvertent application of excessive currents. It will now be noted that by again tracing the circuits of the rectifier, the upper diode of tube V1 is employed as a half-wave rectifier and that the lower diode is not in use. For this switch position, transformer terminal 46 is connected to ground and to the lower terminals of capacitors C2 and C3 of the conventional filter circuit. The upper terminal 45 of the transformer secondary is connected to the anode of the upper diode. The remaining circuits are identical with those previously described and it will be readily recognized that the circuits thus set up are those of a conventional half-wave rectifier. Tests may proceed in this voltage range in the same manner already described for the 600-volt range.

In order to provide a still higher voltage, the upper diode of tube V1 continues to operate as a half-wave rectifier and diode V2 is brought into operation to act as a voltage doubler. This is accomplished by operating switch mechanism 10′ to its extreme right-hand position, thus supplying power to transformer T3 and consequently to the heater of diode V2. It will be noted that switch sections 10B and 10C operate to connect capacitor C1 and diode V2 into circuit with the upper diode of V1 to form the voltage doubler circuit which, when traced out, also will be recognized as of a conventional type. The operation is such that for one half cycle from the secondary of transformer T2, capacitor C2 receives a charge through the upper diode of V1 and during the next half cycle from transformer T2 capacitor C1 receives a charge through diode V2. The charges on capacitors C1 and C2 are series-aiding, thereby doubling the voltage as is well known. Here again the tests are performed in the same manner as described for the 600-volt range.

In order to perform the "forward" current tests, switch mechanism 11′ of Fig. 5 is moved to the "For'd" position. This will cause switch 11 to momentarily interrupt the anode circuit of tube 36 and disable both power supplies by reason of the immediate release of protection relay S1. With specific reference to the power supply in Fig. 7, it will be noted that the release of relay S1 opens protection contacts 2A which are in series with this power supply, thus removing the power source from the test terminals. It will also be noted that when switch mechanism 11′ is operated, section 11A provides an increased output voltage by reason of a connection to tap 35 on the input circuit of the Variac, switch section 11B connects the output circuit of the Variac to the primary of transformer T6 in Fig. 7, switch section 11C transfers the input circuit of tube 17 from the high voltage supply circuit of Fig. 6 to the low voltage supply circuit of Fig. 7 by way of conductor 65 and switch sections 11D and 11E transfer the test terminals to the low voltage output circuit of Fig. 7 by way of conductors 66 and 67.

The resistance of an asymmetric conductor in its "forward" direction is generally very low compared with its "reverse" direction. It is thus necessary for the "forward" power supply to provide a lower voltage and a very much higher current than for the "reverse" test. Fig. 7 discloses a conventional type of rectifier circuit comprising a full-wave rectifier bridge 70 and a filter network comprising capacitors C9 and C10 and the primary of transformer T7 which acts as the filter choke. Power is supplied to the rectifier bridge 70 from the secondary of transformer T6. A switching mechanism 71' operates a range switch 71 which supplies different voltages to the bridge 70 and simultaneously adjusts switch section 71A to select multipliers 73 for the voltmeter M3 as may be required. A current meter M4 is connected in series with the output circuit of this rectifier and is provided with a plurality of shunts which may be selected by switch 74.

Transformer T7 is tuned to the second harmonic ripple frequency by means of capacitor C8, thus presenting a high impedance to currents of this frequency. The voltage of this ripple frequency increases with increasing output current. The output voltage across capacitor C8 is, therefore, used to discharge tube 17 of Fig. 5 when the output current exceeds a predetermined critical limit. It will be noted that one terminal of capacitor C8 is connected to ground and that the other terminal is connected to the grid of tube 17 in Fig. 5 by way of a potentiometer 75, resistor 77, conductor 65 and switch section 11C. For the higher current ranges it is necessary that this voltage be reduced somewhat and this is accomplished by a potential divider comprising resistor 77 and one of the resistors 78 which are automatically switched into the circuit by switch section 74A when switch 74 is operated to change the current range of meter M4.

In order to provide protection against sudden increasing surges of current, another transformer T8 is connected with its low voltage winding in series with the output circuit of this rectifier. The high voltage secondary winding is connected to potentiometer 75 which may be adjusted to provide a predetermined voltage in series with the output voltage of transformer T7. A rectifier 76 is connected across the output of potentiometer 75 and is so poled as to prevent the discharge of tube 17 when a specimen is disconnected from the test terminals while carrying current. Because the current is then decreasing, it will be evident that no circuit protection is required when the specimen is thus disconnected.

The operation of the "forward" test circuit is essentially the same as that already described for the "reverse" test of Fig. 6. Briefly, the circuits are set up by adjusting the voltage range switch mechanism 71', adjusting the current range switch 74', placing a test specimen across the test terminals and operating the Variac slider 33 to its lowermost position to reset the overload protection circuit of Fig. 5. The Variac slider 33 is then gradually moved to higher voltages while the current and voltage supplied to the test specimen are read on meters M4 and M3 respectively.

It should again be emphasized that when either the high voltage supply circuits of Fig. 6 or the low voltage supply circuits of Fig. 7 are used, an overload current will cause the protection relay S1 to immediately release and stop the flow of current from the power supply to the test specimen or other load. The connections are so made that immediate protection is provided for not only the load circuit but also any sensitive instruments which may be connected thereto. Protection is also provided against changing a voltage range without simultaneously and automatically disabling the power supply circuit by reason of the release of the protection relay, this latter function being performed by switch 10 or switch 11 as already described.

It should be understood that the power supply circuits disclosed herein are for illustrative purposes only and are not restrictive in any sense. It should be quite evident that the protection circuits of this invention are applicable to a great variety of power supply and load circuits and will provide adequate protection for many instrument applications.

What is claimed is:

1. An overload protective circuit comprising a differential relay having two opposing windings, contacts for said relay, means for connecting said contacts into a circuit to be protected for controlling the current therein, means for energizing one of said windings to operate said relay whereby current is permitted to flow through the protected circuit, a second relay connected to the remaining winding of the differential relay to release said relay upon the operation of said second relay, means for connecting said second relay to the protected circuit to cause it to operate in response to an overload current therein whereby the flow of said current is immediately stopped upon the release of said differential relay, a reset switch connected to said means for energizing one of said windings whereby energizing current may be caused to flow through said winding, a means for adjusting the current flowing through the protected circuit, and a mechanical link between said adjusting means and said reset switch whereby the latter is operated only when said adjusting means returns the current to a predetermined low value.

2. An overload protective circuit comprising a differential relay having two opposing windings, contacts for said relay, means for connecting said contacts into a circuit to be protected for controlling the current therein, means for energizing one of said windings to operate said relay whereby current is permitted to flow through the protected circuit, a second relay comprising an electron discharge device having an anode, a cathode and a control electrode, a circuit connecting the remaining winding in series with said anode and cathode, an impedance connected in series with the protected circuit, means coupling said control electrode and said cathode to said impedance whereby said discharge device is caused to conduct current to release said differential relay when said impedance carries an overload current, whereby the flow of said current is immediately stopped, and a reset switch connected to said means for energizing one of said windings whereby energizing current may be caused to flow through said winding, a means for adjusting the current flowing through the protected circuit, and a mechanical link between said adjusting means and said reset switch whereby the latter is operated only when said adjusting means returns the current to a predetermined low value.

3. The combination of claim 2 wherein said means for energizing one of said windings comprise a second electron discharge device having an anode, a cathode and a control electrode, a circuit connecting said one winding in series with said anode and cathode, and means for applying a potential to said control electrode to cause said device to conduct current through said winding.

References Cited in the file of this patent

UNITED STATES PATENTS

| | | |
|---|---|---|
| 1,624,370 | Slepian | Apr. 12, 1927 |
| 1,793,478 | Goldsborough | Feb. 24, 1931 |
| 1,819,245 | Jones | Aug. 18, 1931 |
| 1,871,787 | Goldsborough | Aug. 16, 1932 |
| 2,170,203 | Latimer et al. | Aug. 22, 1939 |
| 2,210,669 | Johnson | Aug. 6, 1940 |
| 2,448,371 | Hiehle | Aug. 31, 1948 |
| 2,449,224 | Hegeman et al. | Sept. 14, 1948 |
| 2,509,027 | Zimmermann | May 23, 1950 |
| 2,519,247 | Holden | Aug. 15, 1950 |
| 2,550,496 | Reifschneider | Apr. 24, 1951 |
| 2,692,963 | Hathaway | Oct. 26, 1954 |